May 14, 1935.  W. A. BUCKNER  2,001,180
TRAVELING SPRINKLER
Filed Dec. 26, 1933  2 Sheets-Sheet 1
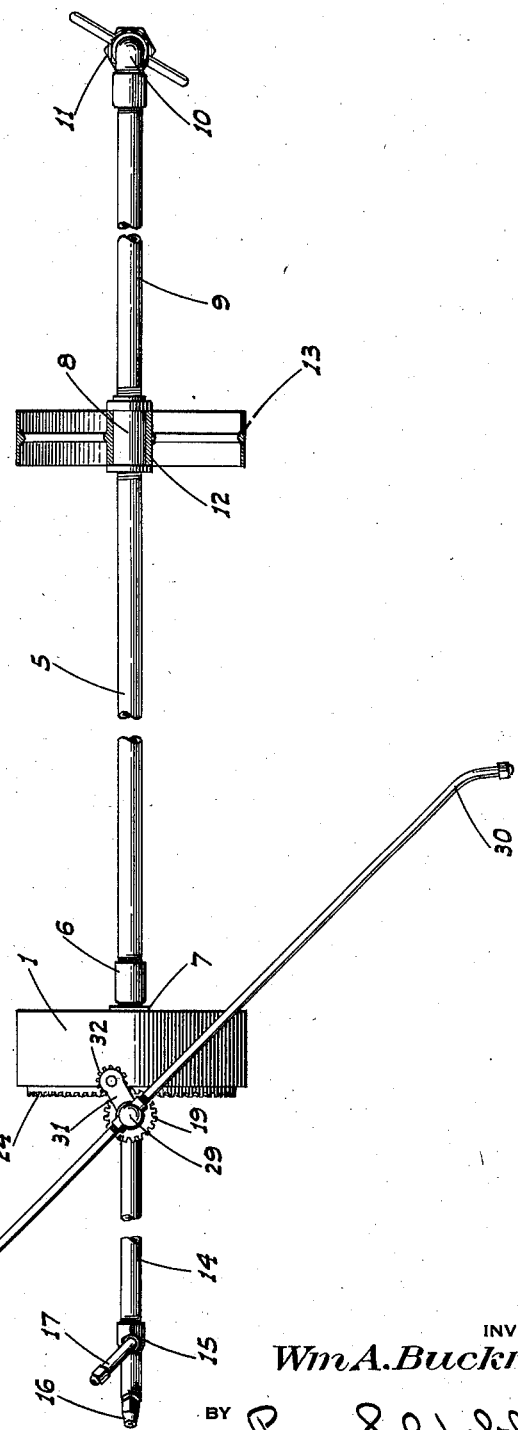
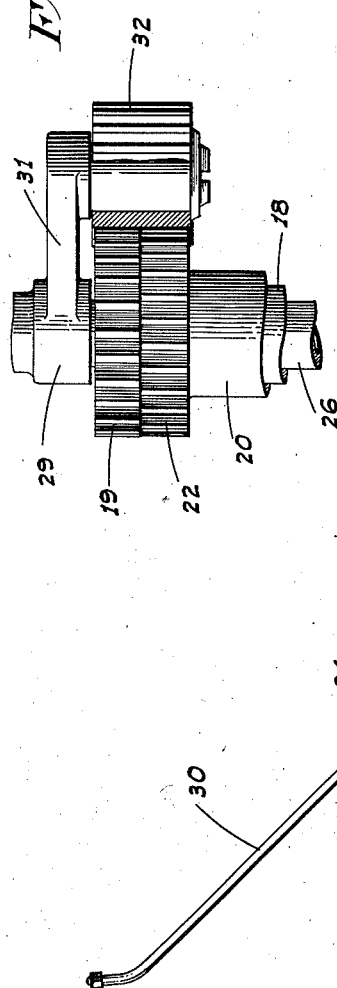
INVENTOR
Wm A. Buckner
BY
ATTORNEY Patented May 14, 1935

2,001,180

UNITED STATES PATENT OFFICE 2,001,180

TRAVELING SPRINKLER

William A. Buckner, Fresno, Calif.

Application December 26, 1933, Serial No. 703,874

4 Claims. (Cl. 299—50)

This invention relates to traveling sprinklers of the type which include a wheel on which the nozzle is supported, which is connected to an axially disposed supporting pipe projecting from a swivel connection with a source of supply, the wheel turning about said swivel connection as an axis.

The principal object of this invention is to provide an improved and efficient speed reduction gearing mechanism between the wheel and the rotating nozzle spindle of the sprinkler, designed so that the desired slow speed of rotation of the wheel is obtained, with a minimum number of gears and so that the mechanism is extremely simple and compact and occupies a very small space.

These objects I accomplish by means of such structure and relative arrangement of parts as will fully appear by a perusal of the following specification and claims.

In the drawings similar characters of reference indicate corresponding parts in the several views:

Figure 1 is a top plan view of the complete assembly.

Figure 3 is a fragmentary side elevation showing the main unit of the speed reduction gearing.

Figure 2:
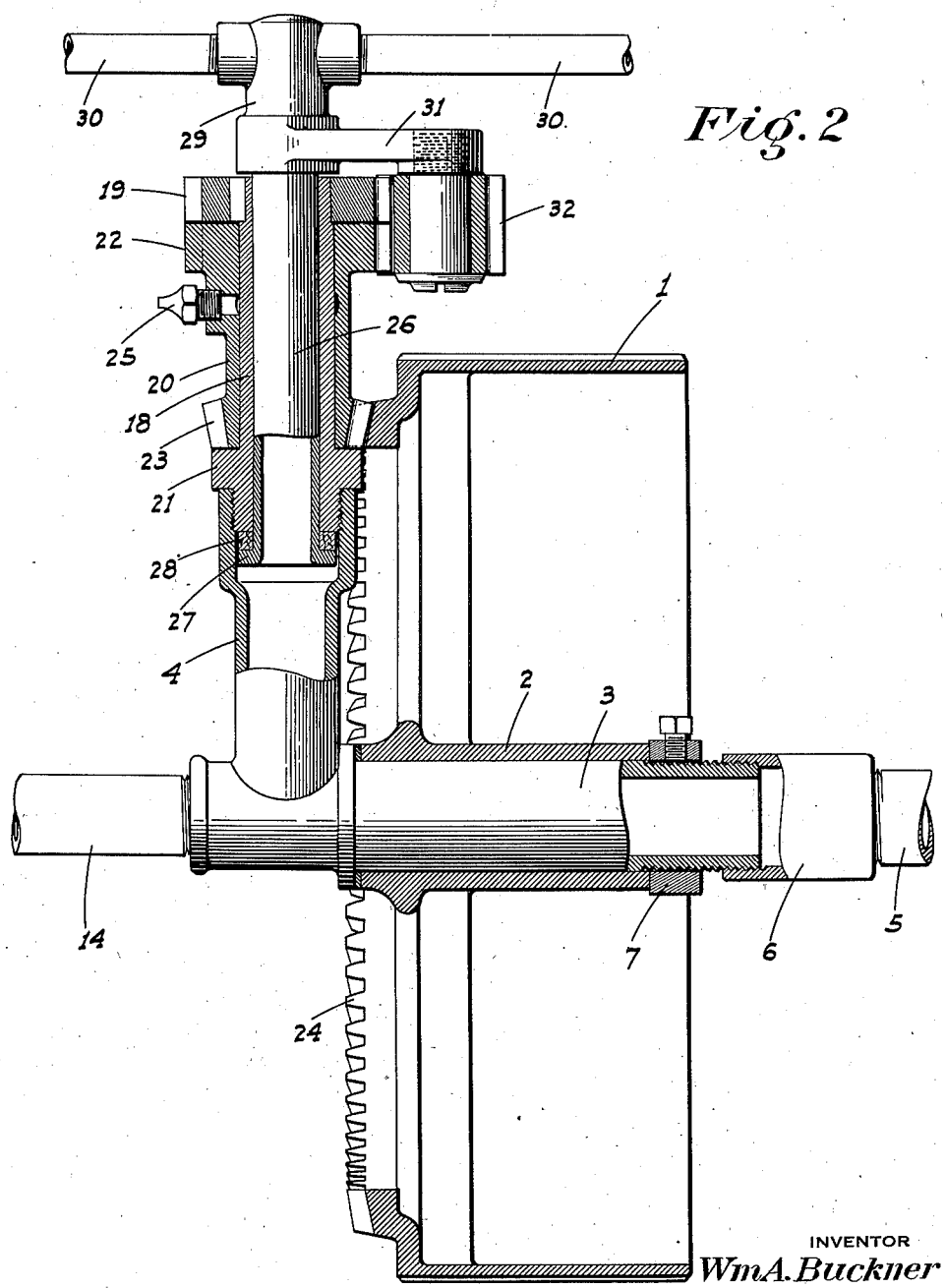
Figure 2 is an enlarged vertical transverse section of the wheel and nozzle unit.

Referring now more particularly to the characters of reference on the drawings, the numeral 1 denotes a ground engaging wheel having a hub 2. This hub turns on a spindle 3 which beyond one end of the hub is formed with an upstanding passage member 4. The spindle beyond the opposite end of the hub is connected to a length of pipe 5 by an ordinary sleeve coupling 6; an adjustable collar 7 on the spindle between the coupling and the adjacent end of the hub preventing longitudinal movement of said spindle.

The pipe 5 is connected at its outer end to another special sleeve coupling 8, which is also connected to the adjacent end of another length of pipe 9, said lengths of pipe being in longitudinal alinement. The opposite end of the pipe 9 is connected to an elbow 10 which is mounted on a vertical axis for swivel movement in a horizontal plane in connection with a suitable fixed water supply pipe and valve unit 11. The coupling 8, besides forming a connection between the lengths of pipe, also serves as a spindle on which the hub 12 of an idler wheel 13 turns. This wheel is used when a total length of piping of between thirty and forty feet is used, so as to hold the same from sagging intermediate its ends. If the sprinkler is to travel through an arc of considerably shorter radius, with a corresponding shorter length of piping, this idler wheel is not necessary.

The water supply pipe and valve unit 11 may be permanently connected to an underground supply, or it may be mounted on a portable sled, as is done when the area to be watered is not equipped with the permanently mounted valves, such as on putting greens, athletic fields and the like.

A pipe 14 of predetermined length projects from the end of the spindle 3 opposite the pipe 5 and has a two-nozzle unit 15 mounted on its outer end. One nozzle 16 of this unit projects from the outer end of the same and is set at a predetermined angle so as to throw a spray the greatest distance. The other nozzle 17, while directing a stream in a substantially horizontal direction, is adjustable about a vertical axis so that it can be set to properly direct its spray over the area not covered by the stream from the main nozzle.

Removably but rigidly mounted in and projecting upwardly from the member 4 is a tubular extension 18. This is to all intents and purposes a part of the member 4 and has a gear 19 fixed on its upper end. Turntable on the extension is a sleeve 20 resting on an outwardly projecting flange 21 formed on the extension 18 immediately above the member 4. The sleeve carries a gear 22 fixed thereon immediately under the gear 19 and while said gears are the same pitch diameter, the gear 22 has one more tooth than the gear 19 for a purpose which will be seen. A bevel pinion 23 on the lower end of the sleeve 20 meshes with a beveled gear 24 disposed on the adjacent side of the wheel 1. A lubricant injection fitting 25 is preferably connected to the sleeve so that the contacting surfaces of the sleeve and extension may be maintained lubricated.

Turnable in the extension is a tubular spindle 26. At its lower end this spindle has an enlarged flange 27 engaging a water sealing washer 28 which bears against the lower end of the extension 18. A head 29 is mounted on the upper end of the spindle above the gear 19, from which a pair of opposed reactionary nozzle arms 30 project horizontally. Below the nozzles the head is formed with a radial arm 31 having a pinion 32 mounted thereon and which constantly engages both gears 19 and 22.

In operation, with the passage of water through the spindle 3, the passage member 4, and the spindle 26 to the nozzles 30, said spindle 26 will be rotated. The arm 31 of course also turns and since the upper gear 19 is stationary the pinion 32 will rotate about its axis. The teeth of the two gears are always in alinement where engaged with a tooth of the pinion. Since however the lower gear has one more tooth than the upper one, the rotation of the pinion about its own axis and also about the spindle 26 as an axis, causes the lower gear to rotate slightly as each one in succession is alined with a tooth of the upper gear, as the pinion moves into mesh with such teeth. In other words, with each complete revolution of the pinion about the gear 19, the gear 22 will be advanced the arcuate distance between adjacent teeth. Therefore if the upper gear for instance has 24 teeth and the lower one 25, the relative speed of rotation between the spindle and said gear will be 25 to 1. The driving speed imparted to the wheel by the bevel pinion and gear is again reduced by reason of the relatively great size of the bevel gear compared to its pinion.

The successful operation of this structure depends on using gears having a large number of teeth relative to their diameter, and by reducing the thickness of the teeth of the lower gear very slightly to compensate for the decrease in the space between the teeth and into which the pinion teeth must project. While the difference in the number of teeth may be more than one in the case of large gears or very small teeth, this would result in a faster rotation of the lower gear, whereas my aim is to keep the speed of the same as low as possible.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I I claim as new and useful and desire to secure by Letters Patent is:

1. In a traveling sprinkler having a horizontal passage member, a turnable coupling connection for one end of said member and means to turn the member about said connection as an axis; a nozzle on the outer end of the member set to discharge water away from the same in a longitudinal direction and at an upward angle, and another nozzle mounted on said member for adjustment about a vertical axis disposed adjacent said first nozzle to discharge a stream in a substantially horizontal direction but inwardly of the area covered by the discharge from the first named nozzle.

2. In a traveling sprinkler having a ground bearing gear wheel, an upstanding rigid passage unit disposed radially of the wheel on one side thereof and adjacent thereto, a sleeve turnable on the unit and whose axis is radially of the wheel, a pinion on the sleeve meshing with the gear wheel, a gear on the upper end of the sleeve, a gear fixed on the passage unit immediately above the sleeve gear, a reaction-nozzle and spindle unit turnable mounted in the passage unit and projecting thereabove, an arm fixed on and projecting radially from the spindle above the passage unit, and a pinion unit turnably mounted on the outer end of the arm in depending relation thereto and engaging the sleeve and passage unit gears.

3. In a traveling sprinkler having a ground bearing gear wheel, an upstanding rigid passage unit disposed radially of the wheel on one side thereof and adjacent thereto, a sleeve turnable on the unit and whose axis is radially of the wheel, a pinion on the sleeve meshing with the gear wheel, a reaction-nozzle and spindle unit turnably mounted in and projecting upwardly from the passage unit, and drive connections between the spindle unit and the sleeve to rotate the latter with the rotation of the spindle unit.

4. In a traveling sprinkler, a horizontal passage spindle, a wheel having a hub turning on the spindle, an upstanding passage unit projecting from the spindle radially of and adjacent one side of the wheel, an enlarged flange integral with the the spindle between the passage unit and the wheel hub and engaged by the adjacent end of the latter, a sleeve turnably mounted on the unit whose axis is radially of the wheel, annular gear teeth on the side of the wheel nearest the unit, a pinion on the sleeve engaging the wheel teeth, a rotatable sprinkler head mounted on the passage unit, and means between the head and sleeve to rotate the sleeve with the rotation of the head.

WILLIAM A. BUCKNER.